July 14, 1925.

G. AJELLO

SAFETY DEVICE FOR AIRCRAFT

Filed Feb. 28, 1923

1,545,808

INVENTOR
Gaetan Ajello

Patented July 14, 1925.

1,545,808

UNITED STATES PATENT OFFICE.

GAETAN AJELLO, OF NEW YORK, N. Y.

SAFETY DEVICE FOR AIRCRAFT.

Application filed February 28, 1923. Serial No. 621,748.

*To all whom it may concern:*

Be it known that I, GAETAN AJELLO, a citizen of the United States, residing at New York, in the county of New York and State of New York, have invented a new and useful Safety Device for Aircraft, of which the following is a specification.

The object of the invention is to provide for aircraft and especially for airplanes additional or emergency surfaces to act as resistance or brake means at landing or against flight or fall, or to act as elevators for a quick take off from the ground, and of such a design as to diminish or neutralize, as required, its force of reaction on its controls and thus obviate intricate and heavy mechanisms while simultaneously the new mechanism and its resultant force would be applied within the outline (streamline) and nucleus of the part of the aircraft into which they are comprised, be it a wing, a fin, etc., thus imitating the animal.

A further object is to provide for an aircraft means serving to produce a tendency to lift the same or counteract in large measure the effect or force of gravity and momentum, and so reduce to a minimum the intensity of the impact, at the moment of landing.

A still further object is to provide for aircraft a wing structure having minimum or limited surface area but so devised and controlled as to become, in effect, a multi-plane structure, to increase the supporting capacity of the aircraft when necessary.

With the above and other objects in view and bearing also in mind the objects of Letters Patent No. 1,354,367 granted me on September 28th 1920, I provide a resistance means consisting of two surfaces so connected that both open or close simultaneously and that can be applied on one or more parts of any portion thereof constituting a surface member of the aircraft as desired and at different angles to the longitudinal or the transverse axis of the aircraft and that can also be applied to the fins of dirigibles.

On the accompanying sheet of drawings, forming part of this specification, for simplicity I elect to illustrate the case of incorporating the emergency surfaces to the wing of an airplane.

Figure 1:
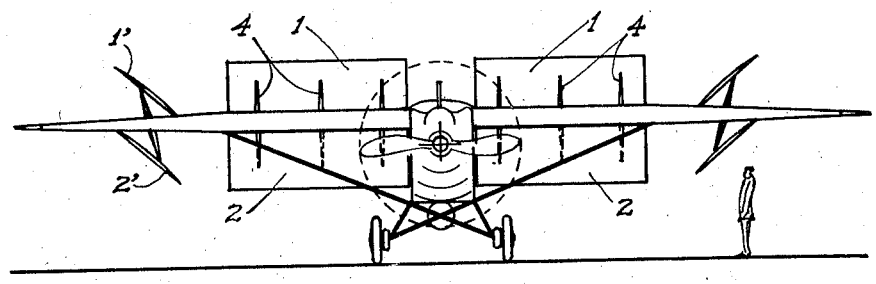
Fig. 1 is the front elevation of an airplane with the braking surfaces opened.

Referring by numerals to the drawings, 1 and 2 represent two braking surfaces respectively, attached to the aircraft by means of hinges 3 and connected together by means of centrally pivoted arms 4. The hinge line 3 for the upper braking surface 1 extends along the rear edge thereof so that said upper surface is adapted to open upward and rearward with respect to its hinge line. The lower braking surface 2 is hinged along its front edge and is adapted to open downward and forward. The pivoted arms 4 are so connected to both of the braking surfaces as to cause them to open or close simultaneously in approximate parallelism. The connections between surfaces 1 and 2 to the arms 4 are through any well known sliding means 5 on rails or tracks 6 secured to the braking surfaces. Evidently the tendency of surface 2 to close while open, by the impact of air, diminishes or neutralizes the tendency of surface 1 to continue to open and vice versa the tendency of surface 1 to open is minimized or neutralized, as desired, by the amount of surface 2 tending to close; therefore while the end of an arm 4 at surface 1 works in tension the other works in compression, consequently the reaction of the braking force at said arm 4 is minimized or neutralized for movements around pivot 7.

It is obvious that arm 4 under such contrary forces can be very easily moved to open or close by a simple lever or any other well known control means.

The amount of area of one surface can be designed larger or smaller in respect to the other to obtain any result desired, as for instance surface 1 can be designed of larger area than surface 2 so as to automatically close itself with surface 2 by gravity when the aircraft is motionless or nearly so.

It is also obvious that by reversing the condition of glide or flight viz: at a start, by causing an air blast by motor propelling means, the air pressure thus caused hitting the inclined planes or surfaces has a tendency to lift the nose of the machine, thereby accelerating its take off from the ground.

Figure 2:
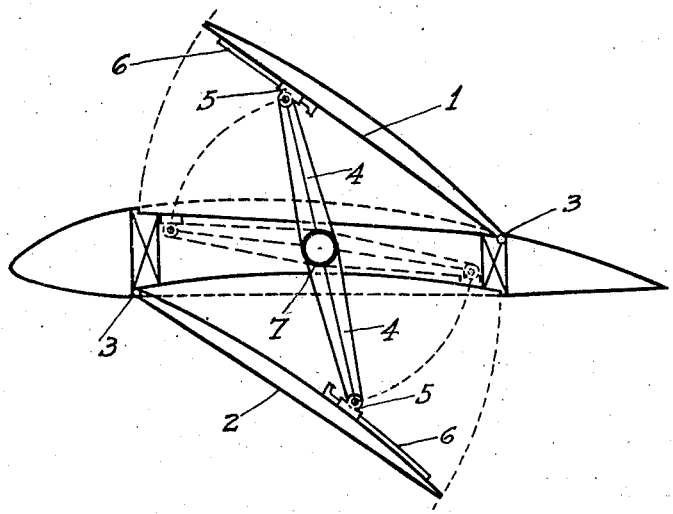
Fig. 2 is a detail section through the wing of the airplane with the braking surfaces embodied thereon.

In Fig. 2 the two surfaces are applied to open or close longitudinally to the length of the wing, but an aircraft may also have similar braking surfaces applied to open transversally to the length of the wing as 1' and 2' Fig. 1.

I claim:

1. In an aircraft, a wing composed of upper and lower surfaces, braking surfaces forming a part of said wing surfaces and connected thereto, said braking surfaces being connected together for substantially parallel movements in respect to each other, and for movement with respect to said wing.

2. In an aircraft, a wing composed of upper and lower surfaces, braking and lifting surfaces forming a part of said wing surfaces and connected thereto, said braking and lifting surfaces being connected together for movement with respect to said wing.

3. In an aircraft, a wing, braking surfaces forming part of the upper and lower surfaces of the wing, means hinging said surfaces at one end to the wing, and sliding connections at the opposite end, said sliding connections including arms centrally connected to a pin or shaft extending longitudinally of and embodied within the nucleus of the wing.

4. In an aircraft, a wing having upper and lower surface portions to open for forming a full braking surface, connecting means between the surfaces and the wing comprising a pivot shaft or pin extending centrally of and embodied within the main part of the wing and a series of arms pivoted thereon, whereby the resultant braking force is transmitted mainly through said shaft forming the nucleus of the wing, said connections including also sliding means between the arms and the surfaces whereby the ends of the arms slide on said braking surfaces thus forming leverage for reduction of reaction on the controls.

5. In an aircraft, braking surfaces forming portions of the upper and lower wing surfaces, the upper braking surface being hinged at the rear and the lower braking surface hinged at the front to said wing, said surfaces being connected together for counterbalancing each other for easy control.

6. In an aircraft, a wing composed of upper and lower surfaces, braking surfaces forming a part of said wing surfaces and connected thereto, said braking surfaces being connected to each other and operating means for said braking surfaces consisting mainly of a longitudinally disposed pivot member embodied within the nucleus of the wing.

7. An aircraft having a member composed of upper and lower surfaces, braking and lifting surfaces forming a part of said member surfaces, means hinging said braking and lifting surfaces at one end to the member and sliding connections at the opposite end, said sliding connections including arms connected to a pivot member extending longitudinally of and embodied within the nucleus of the member.

8. In an aircraft wing, a braking and lifting surface normally forming a part of the streamline of the wing and connected thereto by means of hinges at one end and sliding connections at the other; said sliding connections arranged for movements in conjunction with an arm pivoted within the nucleus of the wing.

9. In an aircraft, braking surfaces forming part of the wing surfaces and hingedly connected thereto, said braking surfaces being connected to each other for substantially parallel movements, and operating means for said braking surfaces consisting of a pivoted arm slidably connected to said braking surfaces.

10. In an aircraft, braking and lifting surfaces forming part of the wing surfaces and hingedly connected thereto, said braking and lifting surfaces being connected by a centrally pivoted arm, means operating said arm for moving said surfaces so that the movement of one surface is counterbalanced by the movement of the other for easy control.

GAETAN AJELLO.